United States Patent
Nagai et al.

(10) Patent No.: US 7,896,531 B2
(45) Date of Patent: Mar. 1, 2011

(54) ELECTRICAL ASSEMBLY AND METHOD OF TRANSPORTING THE SAME

(75) Inventors: Kentaro Nagai, Shizuoka (JP); Yoshinori Hirayama, Kanagawa (JP); Shinji Yamada, Kanagawa (JP)

(73) Assignee: Yazaki Corporation, Tokyo (JP)

( * ) Notice: Subject to any disclaimer, the term of this patent is extended or adjusted under 35 U.S.C. 154(b) by 224 days.

(21) Appl. No.: 11/637,913

(22) Filed: Dec. 13, 2006

(65) Prior Publication Data
US 2007/0175743 A1    Aug. 2, 2007

(30) Foreign Application Priority Data
Jan. 30, 2006    (JP) ............... 2006-020303

(51) Int. Cl.
*B60Q 1/00* (2006.01)
*H05K 7/00* (2006.01)

(52) U.S. Cl. ............ 362/493; 362/490; 362/479; 362/548; 362/549; 362/362; 361/735; 361/728; 361/729

(58) Field of Classification Search ............... 362/479, 362/471, 493, 548, 549, 488–492, 547, 362, 362/196; 361/728–729, 735
See application file for complete search history.

(56) References Cited

U.S. PATENT DOCUMENTS

| | | | | |
|---|---|---|---|---|
| 2,116,317 A * | 5/1938 | Marshall et al. | ............. | 362/490 |
| 6,022,131 A * | 2/2000 | Morimoto et al. | ........... | 362/549 |
| 6,056,423 A * | 5/2000 | Takano et al. | ............... | 362/488 |
| 6,079,859 A * | 6/2000 | Takano | ...................... | 362/490 |
| 6,601,976 B1 * | 8/2003 | Rhee | .......................... | 362/374 |
| 6,616,311 B2 * | 9/2003 | Soga et al. | ................... | 362/488 |
| 6,746,139 B2 * | 6/2004 | Sinzawa et al. | ............. | 362/490 |
| 2002/0126495 A1* | 9/2002 | Nagata | ....................... | 362/488 |
| 2007/0022730 A1* | 2/2007 | Iwami et al. | ................ | 59/78.1 |
| 2007/0139944 A1* | 6/2007 | Nagai | ......................... | 362/488 |

FOREIGN PATENT DOCUMENTS

| | | |
|---|---|---|
| JP | 46-14556 | 5/1971 |
| JP | 02-112557 | 9/1990 |
| JP | 04-164720 | 6/1992 |
| JP | 2002-019782 | 1/2002 |
| JP | 2005-14824 | 1/2005 |

\* cited by examiner

*Primary Examiner*—Sandra L O Shea
*Assistant Examiner*—Danielle Allen
(74) *Attorney, Agent, or Firm*—Kratz, Quintos & Hanson, LLP

(57) ABSTRACT

Providing an electrical assembly, which can protect electric components provided at the electrical assembly from damage, and minimize output amount of recycle material and waste material, a functional module as the electric assembly includes a lamp and a switch as the electric components. The lamp extends from a center area of a bottom wall of a housing so as to slant toward an outside of the housing according to going apart from the bottom wall. The switch extends vertically from one end of the bottom wall. Ends of the lamp and the switch far from the bottom wall project out of the housing. When the functional modules are transported to an assembling line, the pair of functional modules is stacked on each other so as to arrange the lamp face to each other in parallel, and fixed to each other.

6 Claims, 11 Drawing Sheets

ELECTRICAL ASSEMBLY AND METHOD OF TRANSPORTING THE SAME

The priority application Number Japan Patent Application 2006-020303 upon which this patent application is based is hereby incorporated by reference.

BACKGROUND OF THE INVENTION

1. Field of the Invention

This invention relates to an electrical assembly structuring an electrical equipment such as a room lamp unit for a vehicle and a method of transporting the electrical assembly.

2. Description of the Related Art

When a usual room lamp unit is mounted on a roof trim of a vehicle, a worker is forced unnatural posture to face toward a roof from inside of a passenger room. It causes poor productivity. For improving the productivity, by separating a functional module as an electrical assembly, in which a lamp and switch as electric components are integrated, and a design module (a lens and a bezel) for leading light of the lamp into the passenger room, a method of mounting the room lamp unit on the roof trim can be done only by fitting the modules transported from a manufacturing line to an assembling line. The method largely reduces man-hour to work facing toward the roof.

Since the lamp in the functional module is exposed from a housing, it may happen to damage the lamp by abutting on the other components in transportation from the manufacturing line to the assembling line. For preventing that, the functional module is attached with a protecting holder 200 shown in FIGS. 11A, 11B (refer Patent document 1) for transportation. FIG. 11A is a perspective view showing a pair of functional modules 120a, 120b with a lamp 121 and the protecting holder 200 having covers 202 covering the lamps 121. FIG. 11B is a perspective view showing a condition of that the protecting holder 200 shown in FIG. 11A is attached on the pair of functional modules 120a, 120b. As shown in FIG. 11A, in the protecting holder 200, the covers 202 are respectively continued through each hinge 203 rotatably to both ends of a holder main body 201. By engaging the holder main body 201 and housings 124 of the pair of functional modules 120a, 120b, the housings 124 are fixed. By the covers 202 are attached so as to cover the lamps 121, it is prevented that the lamps 121 is abutted on a wiring harness 123 or the other components mounted on the housing 124. The patent document 1 is the Japan Published Patent Application No. 2005-14824.

SUMMARY OF THE INVENTION

Objects to be Solved

The aforesaid protecting holder 200 is unnecessary after transporting the functional modules 120a, 120b to the assembling line. Therefore, it is required to process the protecting holder 200 for reproduced/recycled material, and the process causes increase of work process and an obstruction of cost reduction.

One object of the present invention is to provide an electrical assembly and a method of transporting the same, which can protect an electric component mounted on the electrical assembly from damage and minimize amount of recycle material and waste material.

How to Attain the Object of the Present Invention

In order to attain the object of the present invention, an electrical assembly is characterised in that the electrical assembly includes a housing and an electric component mounted on the housing so as to project a part of the electric component to outside of the housing, and the electric component is arranged as the projected part of the electric component can be received in a room of a mating housing of a mating electrical assembly when the housings of a pair of the electrical assemblies are stacked upon each other so as to make the electric components thereof face each other.

The electrical assembly is further characterised in the electrical assembly mentioned above in that the electric component is projected from the housing and inclined against a flat surface of the housing.

The electrical assembly is further characterised in the electrical assembly mentioned above in that the electrical assembling further includes a fixing member for fixing the housing of the electrical assembly and the mating housing of the mating electrical assembly when the electrical assembly is stacked on the mating electrical assembly so as to make the electric components face each other.

The electrical assembly is further characterised in the electrical assembly mentioned above in that fixing member includes a lock main body projecting from the housing and extending linearly from one end of the housing toward the other end of the housing, a lock receiving portion arranged at one end of the lock main body, and a lock portion provided at the other end of the lock main body for engaging with the lock receiving portion of the mating electrical assembly.

The electrical assembly is further characterised in the electrical assembly mentioned above in that a mark for distinguishing a direction, in which the electrical assembly must be stacked on the mating electrical assembly, is provided at the both of the housing and the mating housing.

The electrical assembly is further characterised in the electrical assembly mentioned above in that the electric components includes a first electric component of a lamp and a second electric component of a switch connected with the lamp for turning ON/OFF of an electric circuit.

A method of transporting an electrical assembly is characterised that the method of transporting the electrical assembly having a housing and an electric component mounted on the housing so as to project a part of the electric component to outside of the housing, includes the steps of stacking a pair of the electrical assemblies on each other so as to make the electric components face each other; receiving the projected part of the electric component of the electrical assembly into a room provided in a mating electrical assembly for protecting the electric component; fixing the housings of the pair of the electrical assemblies to each other; and transporting the pair of the electrical assemblies.

EFFECT OF THE INVENTION

According to the invention, since the electric component is arranged as the projected part of the electric component can be received in the room of the mating housing of the mating electrical assembly when the housings of the pair of electrical assemblies are stacked upon each other so as to make the electric components thereof face each other, by stacking the pair of electrical assemblies and transporting it, the electric component can be protected from touch and damage by the other components. A protecting holder for protecting the electric component is not required, so that output of the recycle material and the waste material can be minimized.

According to the invention, since a projecting height of the projected part of the electric component inclined against the housing can be smaller than a height of the electric component arranged vertically, a depth of the room for the inclined component can be shallower than that of the room for the vertical component. Thereby, the electrical assembly can be thinner. By arranging the electric component asymmetrically with an offset from the center of the housing, the pair of electrical assemblies can be stacked to be aligned in alternate orientation without abutting electric components to each other.

According to the invention, since the electrical assembling includes the fixing member for fixing the housing of the electrical assembly and the mating housing of the mating electrical assembly when the electrical assembly is stacked on the mating electrical assembly so as to make the electric components face each other, the housings can be fixed to each other without bundling member such as a vinyl tape for transportation. Thereby, output of the recycle material and the waste material can be minimized.

According to the invention, by engaging the lock portion of the electrical assembly and the lock receiving portion of the mating electrical assembly when the electrical assembly is stacked on the mating electrical assembly so as to make the electric components face each other, the housings can be fixed to each other. The housings can be fixed to each other without bundling member such as a vinyl tape for transportation. Thereby, output of the recycle material and the waste material can be minimized.

According to the invention, since the mark for distinguishing the direction of stacking the electrical assemblies so as to receive each electric component into each room is provided at each housing of the electrical assemblies, visibility for stacking direction can be improved. Thereby, the pair of electrical assemblies can be easily stacked with security, and workability can be improved.

According to the invention, each lamp and each switch are received in the room of the mating housing of each housing when the pair of electrical assemblies are stacked each other so as to make the electric components thereof face each other. By stacking the pair of electrical assemblies and transporting it as mentioned above, the electric component can be protected from touch and damage by the other components. The protecting holder for protecting the electric component is not required, so that amount of the recycle material and the waste material can be minimized.

According to the invention, by stacking the pair of the electrical assemblies on each other so as to make the electric components face each other; receiving the projected part of the electric component of the electrical assembly into a room provided in a mating electrical assembly for protecting the electric component; fixing the housings of the pair of the electrical assemblies to each other; and transporting the pair of the electrical assemblies, the electric component can be protected from touch and damage by the other components without the protecting holder for protecting the electric component. Thereby, the amount of the recycle material and the waste material can be minimized. Since the stacked electrical assemblies to be integrated are packed into a transport box to be effectively without unnecessary gaps, more amount of the electrical assembly can be packed than amount of the electrical assembly not to be integrated.

The above and other objects and features of this invention will become more apparent from the following description taken in conjunction with the accompanying drawings.

DESCRIPTION OF THE PREFERRED EMBODIMENT

Figure 1A:
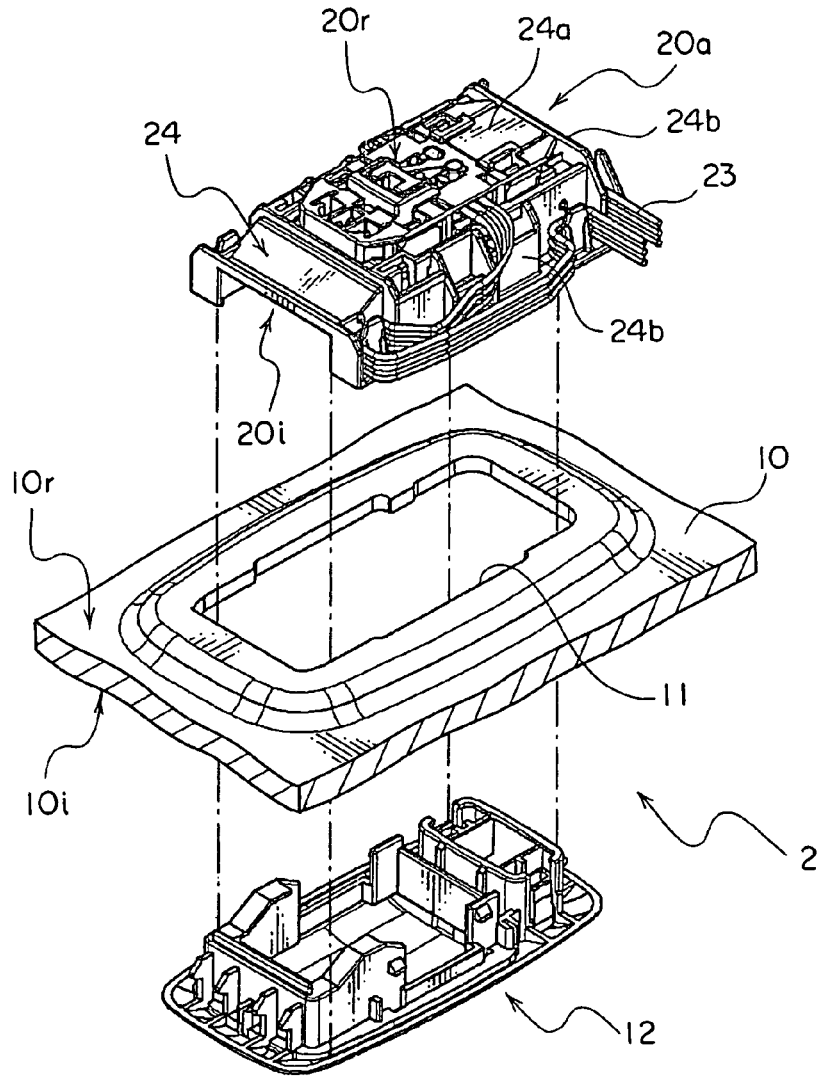
FIG. 1A is an exploded perspective view of a lamp unit including a functional module of a first embodiment according to the present invention.
Figure 1B:
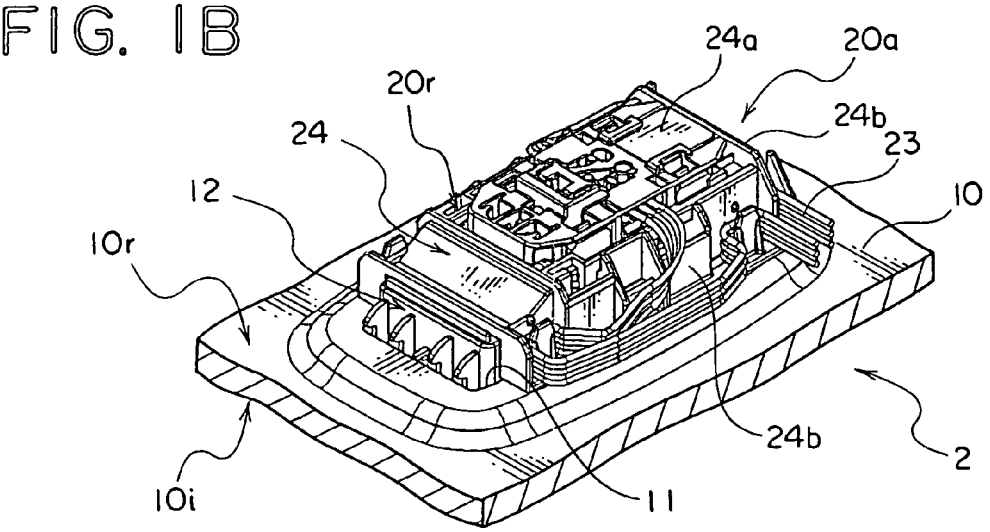
FIG. 1B is a perspective view of the assembled lamp unit shown in FIG. 1A.
Figure 2:
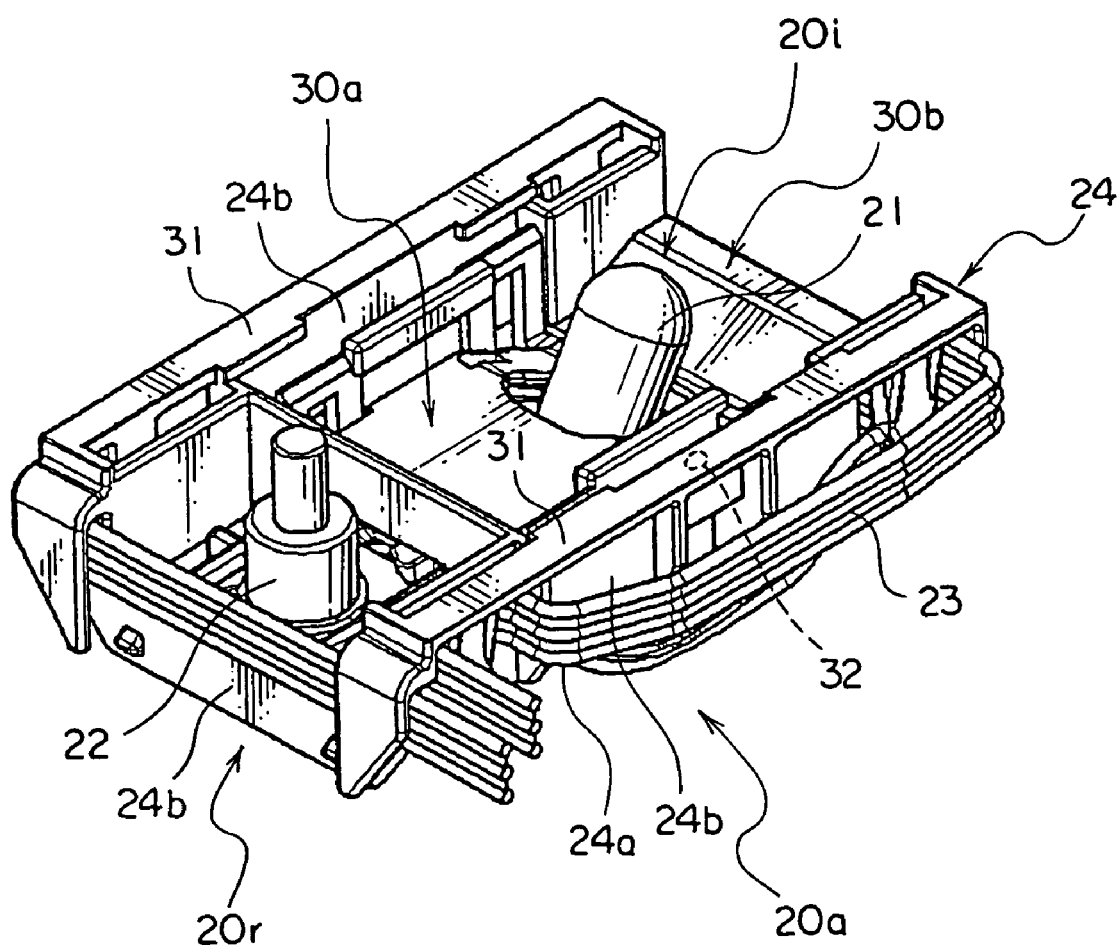
FIG. 2 is a perspective view of the functional module shown in FIG. 1A.
Figure 3:
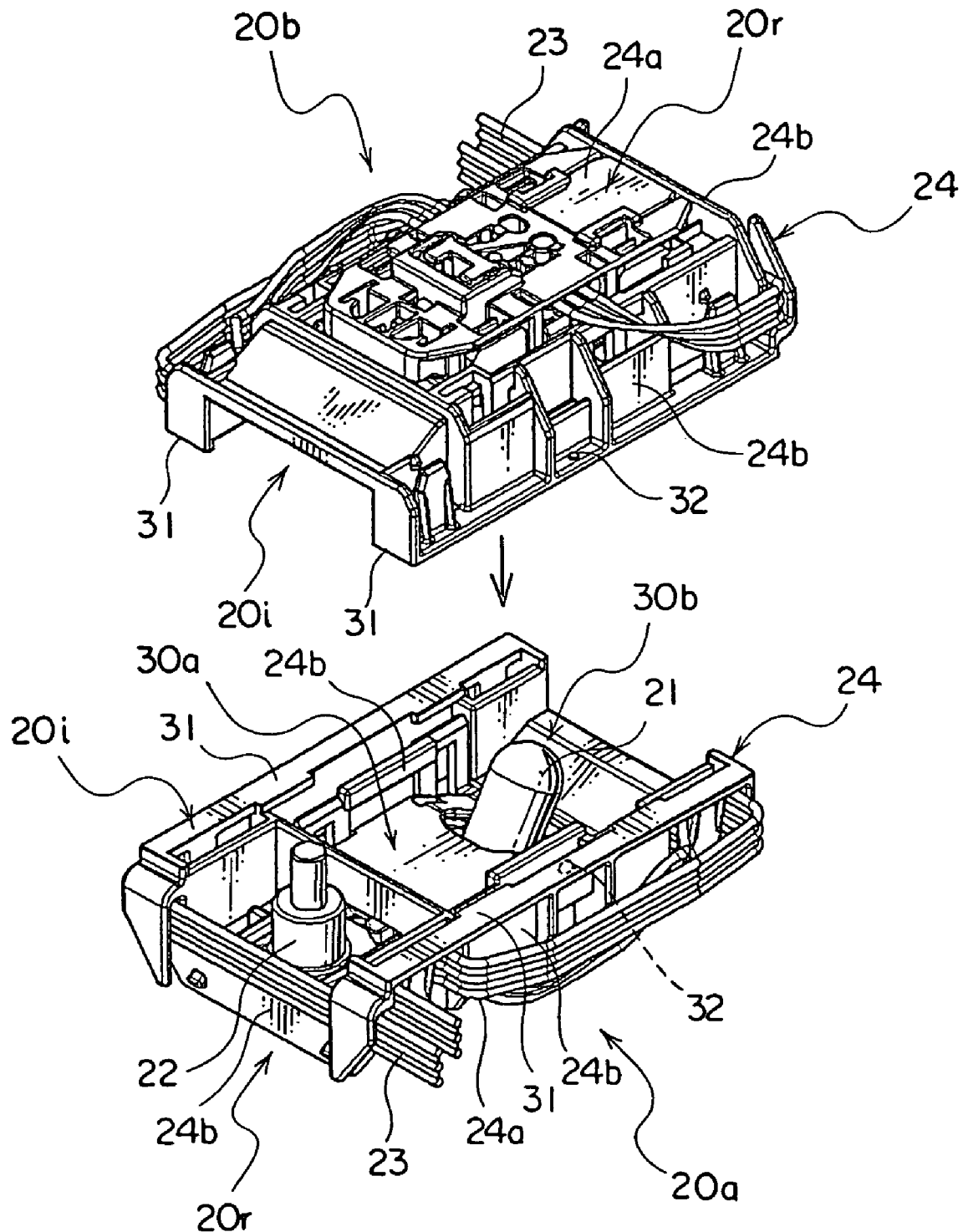
FIG. 3 is a perspective view of one functional module shown in FIG. 2 and the other functional module, which face to each other.
Figure 4:
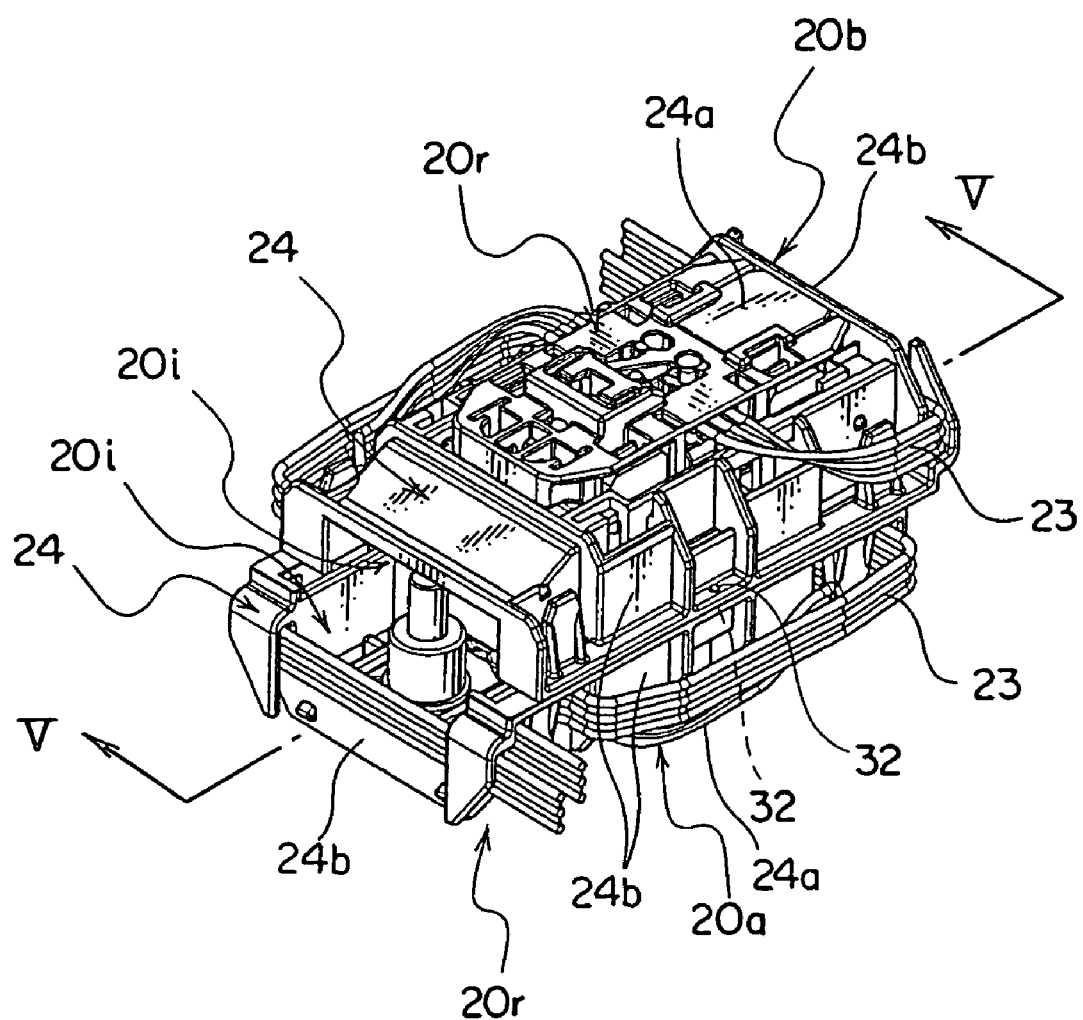
FIG. 4 is a perspective view of a pair of functional modules shown in FIG. 3, which is stacked.
Figure 5:
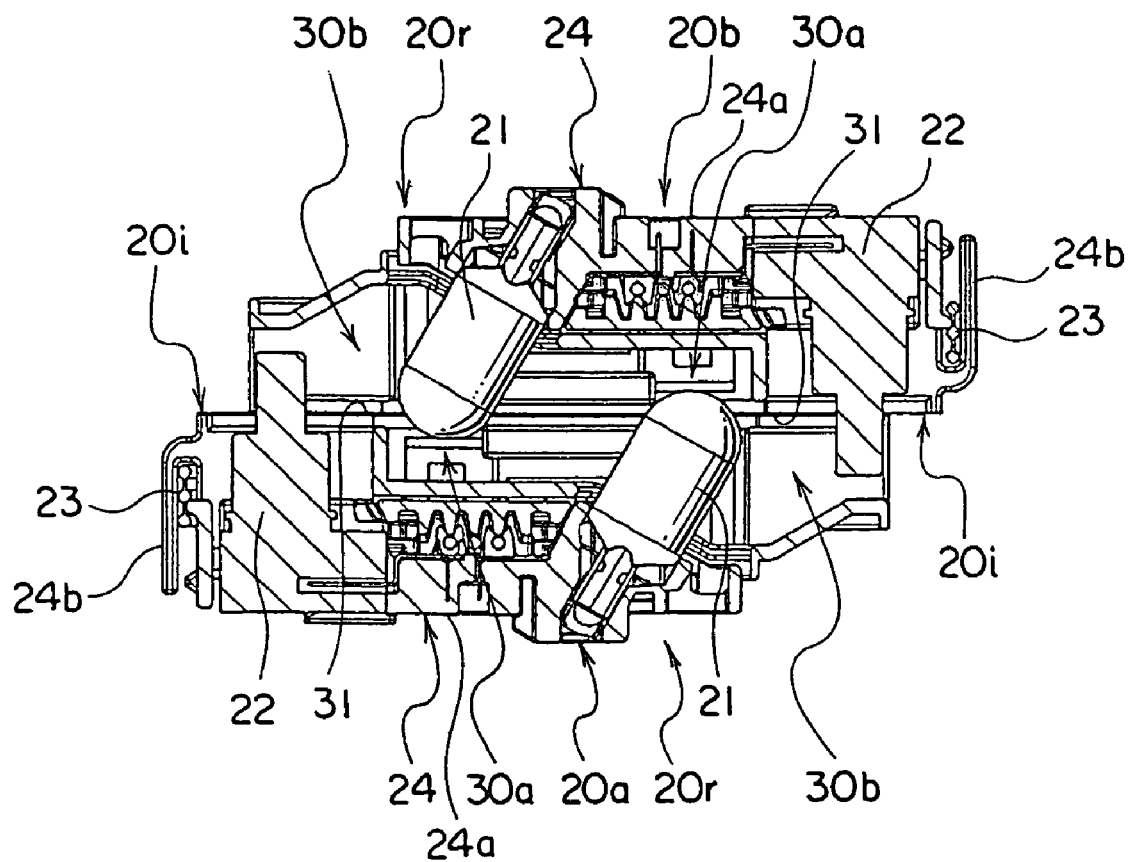
FIG. 5 is a cross sectional view taken along the line V-V in FIG. 4.
Figure 6:
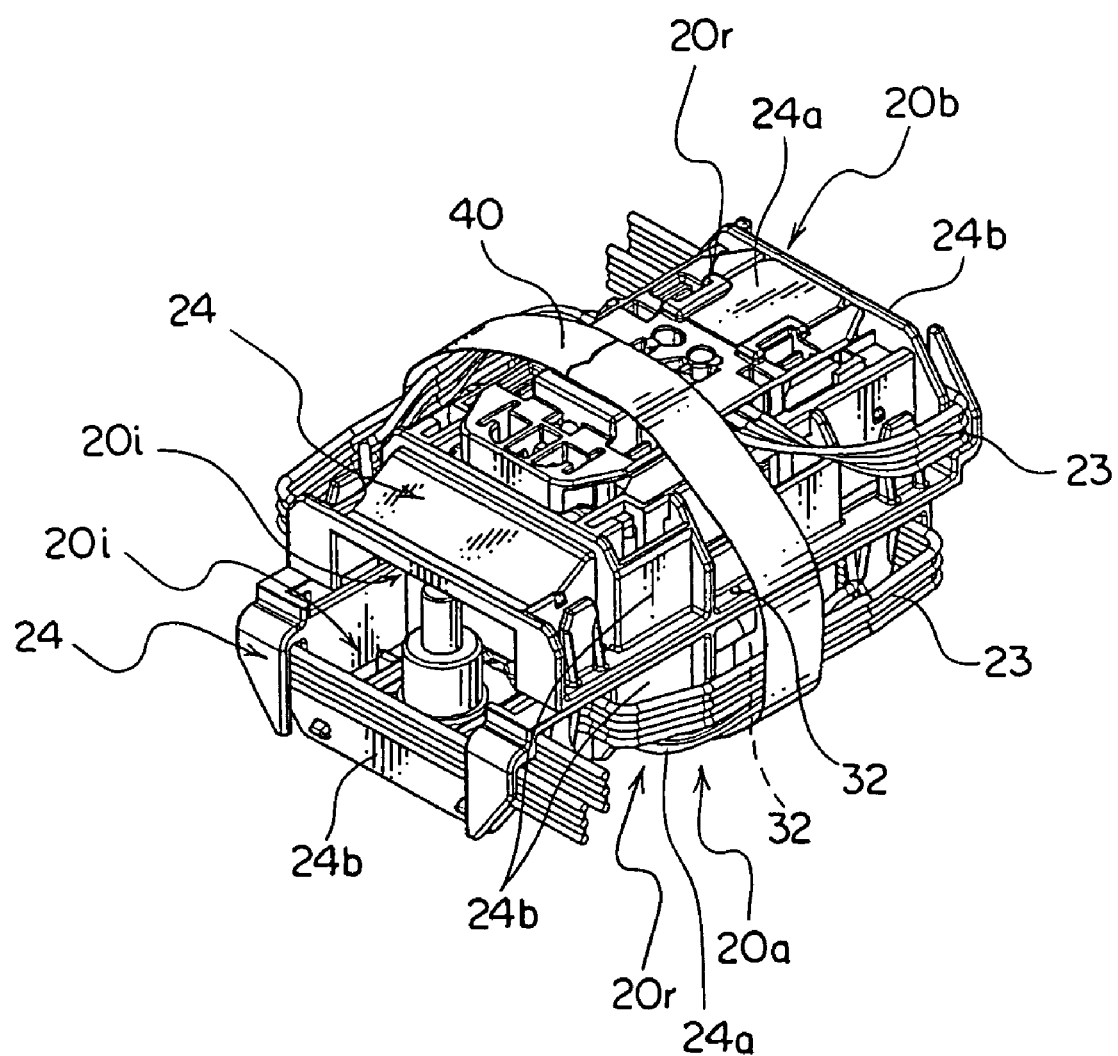
FIG. 6 is a perspective view of the pair of functional modules shown in FIG. 3, which are fixed to each other.

An electrical assembly of a first embodiment according to the present invention will be described with reference to FIGS. 1-6. FIG. 1A is an exploded perspective view of a lamp unit having a functional module (electrical assembly) of the first embodiment according to the present invention. FIG. 1B is a perspective view of the mounted lamp unit shown in FIG. 1A. FIG. 2 is a perspective view of the functional module shown in FIG. 1A. FIG. 3 is a perspective view showing a condition of making the functional module face the mating functional module. FIG. 4 is a perspective view showing a condition of stacking a pair of functional modules shown in FIG. 3 on each other. FIG. 5 is a cross sectional view taken along the line V-V in FIG. 4. FIG. 6 is a perspective view showing a condition of fixing the housings of the pair of functional modules shown in FIG. 3 to each other.

The functional module 20a as the electrical assembly according to the present invention forms the lamp unit 2 (interior light unit for a vehicle) shown in FIGS. 1A, 1B.

The lamp unit 2 for lighting a passenger room of a car includes a functional module 20a and a lens as shown in FIG. 1A. The functional module 20a is provided with a lamp 21 for emitting light of the lamp unit 2, and mounted in an open window 11 formed at a roof trim 10 (interior wall made of synthetic resin for forming a roof of the car) which is arranged inside the passenger room of the car. Detail structure of the functional module 20a will be described later. The functional module 20a and the lens 12 of the lamp unit 2 are manufactured at a component manufacturing line and transported to assembling process. The mark 10i in FIG. 1A shows a surface of the roof trim 10 to be arranged at a side of the passenger room. The mark 10r in FIG. 1A shows a surface of the roof trim 10 to be arranged at a side of a car body panel (not shown). The mark 20i shows a surface of the functional module 20a to be arranged at the side of the passenger room and the mark 20r shows a surface of the functional module 20a to be arranged at the side of the car body panel.

The lens 12 is formed into a plate shape with transparent synthetic resin. The lens 12 is inserted through the open window 11 and engaged with the functional module 20a. The lens 12 leads light emitted by the functional module 20a into the passenger room. The lens 12 corresponds to a design module to be an exterior of the lamp unit 2.

The functional module 20a, as shown in FIG. 2, includes a housing 24, the lamp 21 as a first electric component, a plurality of bus bars (not shown), electric wires 23 of a wiring harness supplying electric power from a power source to the lamp 21, and a switch 22 as a second electric component.

The housing 24 made of insulation synthetic resin is formed with a flat bottom wall 24a and a plurality of surrounding walls 24b extending vertically from the bottom wall 24a. In the embodiment, three surrounding walls 24b are provided. One of the surrounding walls 24b extends from an outer edge of one end of lengthwise of the bottom wall 24a. Two others of the surrounding walls 24b continue to the one of surrounding wall 24b extending from the outer edge of the one end and are arranged with a distance to each other. A flat wall 31 is arranged in parallel to the bottom wall 24a at an edge far side from the bottom wall 24b of each two others of surrounding walls 24b. An identification mark 32 is provided on the flat wall 31 at this side in FIG. 2 of the two flat walls 31 and near side the surface 20r. The identification mark 32 is a mark having a round, triangle or rectangular shape for recognizing easily orientation of the functional module 20a to be stacked on the other functional module 20b for transporting them to an assembling line.

The lamp 21 projects vertically from a central area of the bottom wall 24a. The lamp 21 has a light portion formed into a cylindrical shape for emitting light and an electrode portion (not shown) arranged near the bottom wall 24a. The lamp 21 is slant to the flat wall 31 of the housing 24. Thereby, an axis of the lamp 21 intersects both the bottom wall 24a of the housing 24 and a plane perpendicular to the bottom wall 24a. In the embodiment, the lamp 21 is slant toward the other end of the bottom wall 24a in which the surrounding wall 24b is not arranged. An end of the lamp 21 far from the bottom wall 24a projects from the flat wall 31 toward a side far from the bottom wall 24a. A side outer than the lamp 21 at the other end of the bottom wall 24a is provided with a room 30b as a room for protecting electric components. When the functional module 20a is transported to the assembling line, the switch 22 of the other functional module 20b stacked on the functional module 20a is received in the room 30b.

The bus bar is formed by punching conductive sheet metal. The bus bar connects electrically electrodes of the lamp 21 and the electric wires 23. One end of the electric wire 23 is connected with the bus bar. The other end of the electric wire 23 is connected with the other wiring harness wired in a car body (not shown) and connected to a power source. The electric wire 23 is fixed on the housing 24 around an outer surface of the housing 24.

The switch 22 projects from an area of one end of the bottom wall 24a. An end of the switch 22 far from the bottom wall 24a projects from the flat wall 31 toward the side far from the bottom wall 24a. The switch 21 is located with a distance from the lamp 21. The switch 22 turns ON/OFF electric connection between the electric wire 23 and the electrodes of the lamp 21. The room 30a as the room for protecting electric components is provided between the switch 22 and the lamp 21. When the functional module 20a is transported to the assembling line, the lamp 21 of the other functional module 20b stacked on the functional module 20a is received in the room 30a.

When the functional module 20a is transported to the assembling line, the other functional module 20b structured as same as the functional module 20a (only direction of leading the electric wire 23 is inverted to the functional module 20a in the embodiment) is stacked so as to make the lamps 21 correspond to each other in parallel. In a pair of stacked functional modules 20a, 20b, the flat walls 31 abut on mating flat walls 31. By aligning the identification marks 32 provided only on each one side of flat walls 31 of the pair of functional modules 20a, 20b in the same orientation, positioning for stacking the functional modules 20a, 20b can be easily done.

In the stacked pair of functional modules 20a, 20b as show in FIG. 5, the projecting ends of the lamps 21 from the housings 24 are respectively received into the mating rooms 30a of the functional modules 20a, 20b. The projecting ends of the switches 22 from the housings 24 are respectively received into the mating rooms 30b of the functional modules 20a, 20b. At this time, the pair of lamps 21 is arranged in parallel to each other, so that the lamps 21 are received in the mating rooms 30a without striking the lamps 21 to each other. The switch 22, which is provided at the area of one end of the bottom wall 24a, is located far from the switch 22 at the area of the other end of the mating functional module, so that the switches 22 are received in the mating rooms 30b without striking the switches 22 to each other.

The pair of functional modules 20a, 20b, in which the lamps 21 and the switches 22 are covered by the mating housings 24 to each other, is fixed by winding on the outer side thereof with vinyl tape 40 and transported to the assembling line.

According to the embodiment, the lamp 21 is mounted slantingly to the housing 24, so that when the pair of functional modules 20a, 20b is stacked so as to make the lamps 21 face to each other, the lamps 21 are arranged in parallel to each other and received in the rooms 30a of the mating housings 24 without striking the lamps 21 to each other. Since the switch 22 is located with a distance from the lamp 21, when the pair of functional modules 20a, 20b is stacked on each other, the switch 22 is located far from the switch 22 at the area of the other end of the mating functional module. Thereby the switches 22 are received in the mating rooms 30b without striking the switches 22 to each other. When transporting the functional modules 20a, 20b, by stacking the functional modules 20a, 20b, the lamp 21 and the switch 22 are protected from damages by striking the other components. Electric components, which are exposed inside the surround walls 24b, other than the lamp 21 and the switch 22 can be also protected. Thus, the protecting holder for protecting the lamp 21 and the switch 22 is not required, so that amount of the recycle material and the waste material can be minimized.

Figure 7:
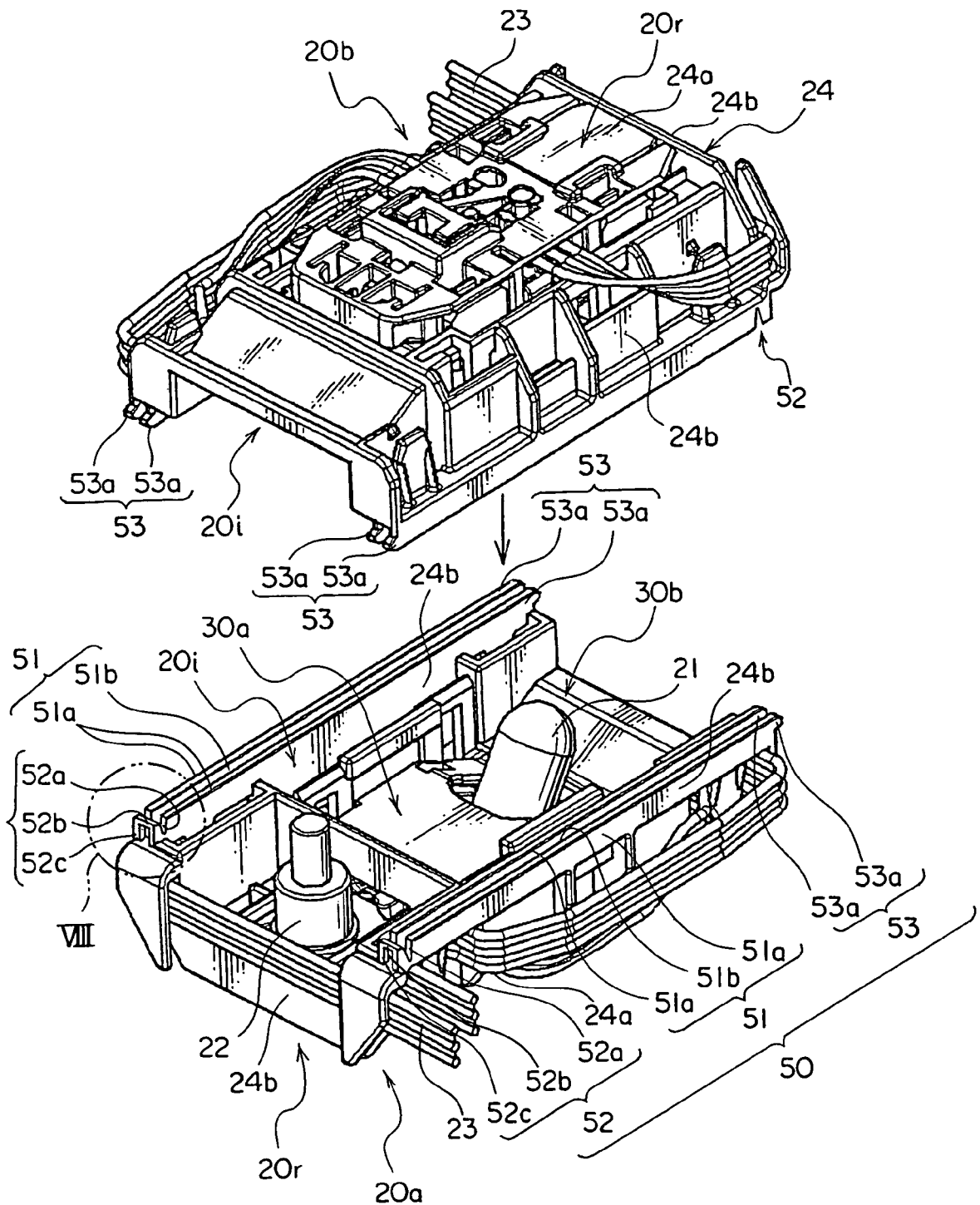
FIG. 7 is a perspective view of a pair of functional modules according to a second embodiment, which faces to each other.
Figure 8:
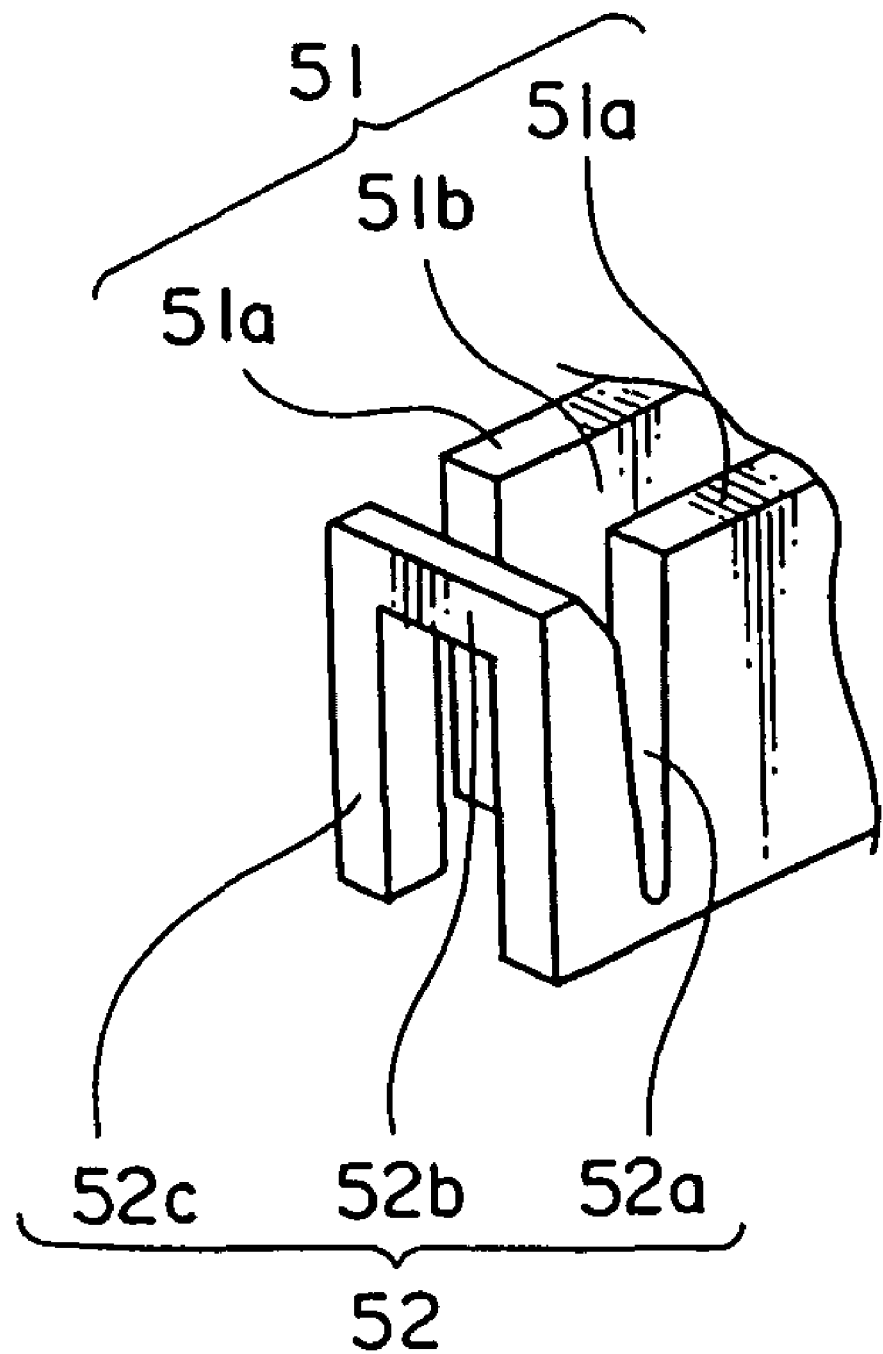
FIG. 8 is an expanded perspective view of a VIII area in FIG. 7.
Figure 9:
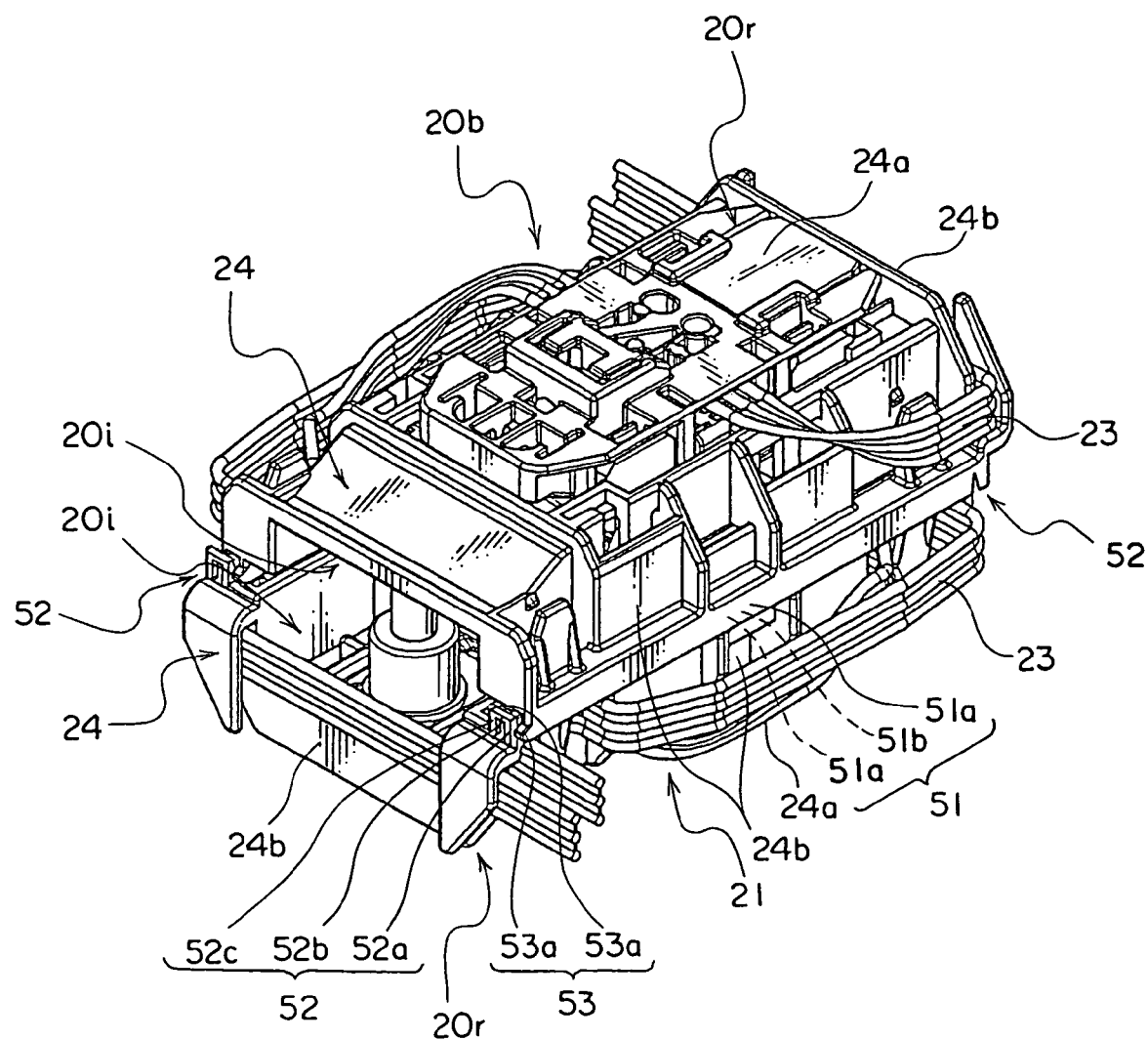
FIG. 9 is a perspective view of the pair of functional modules shown in FIG. 7, which are fixed to each other.
Figure 10:
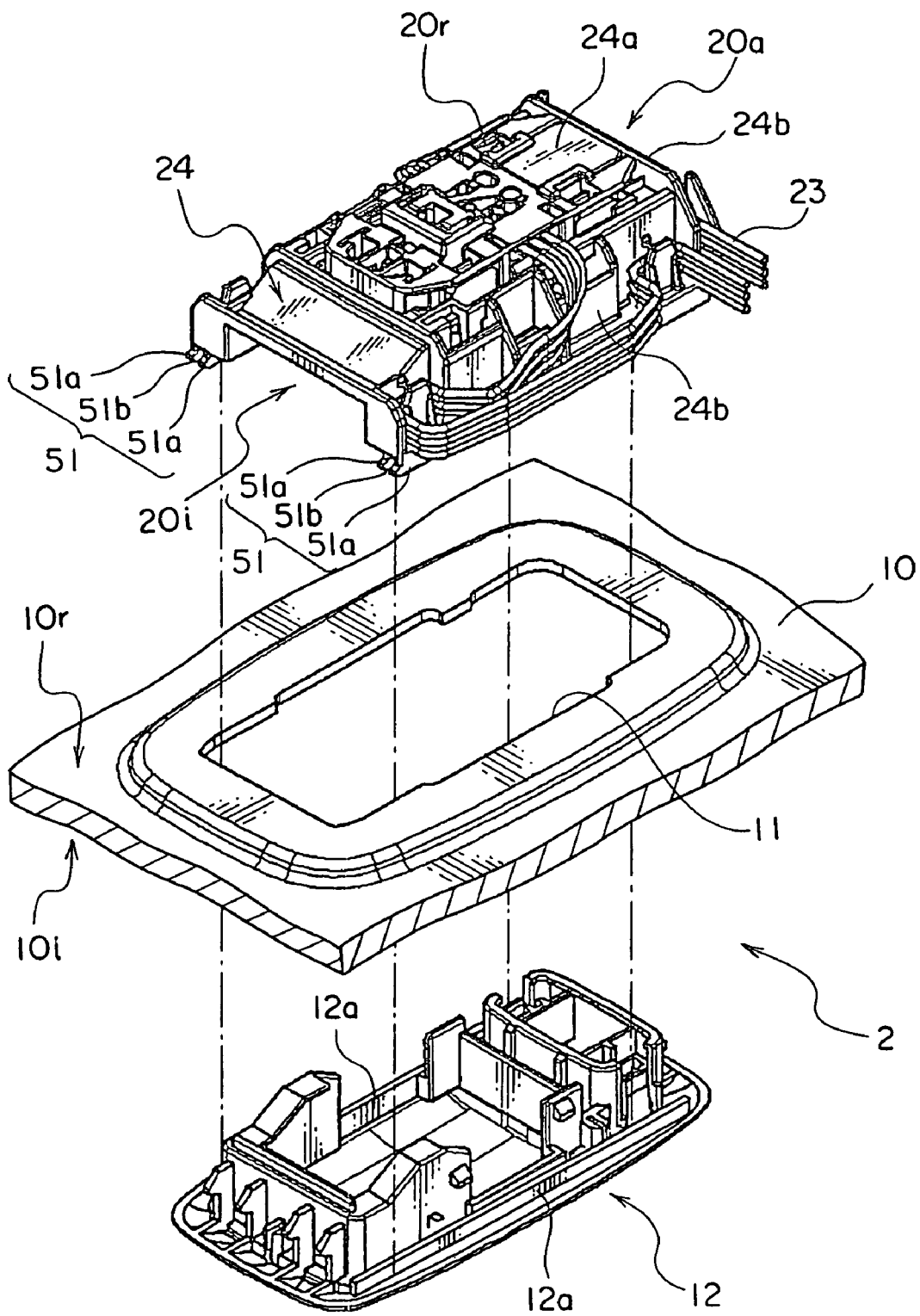
FIG. 10 is an exploded perspective view of the lamp unit including a functional module of the embodiment.
Figure 11A:
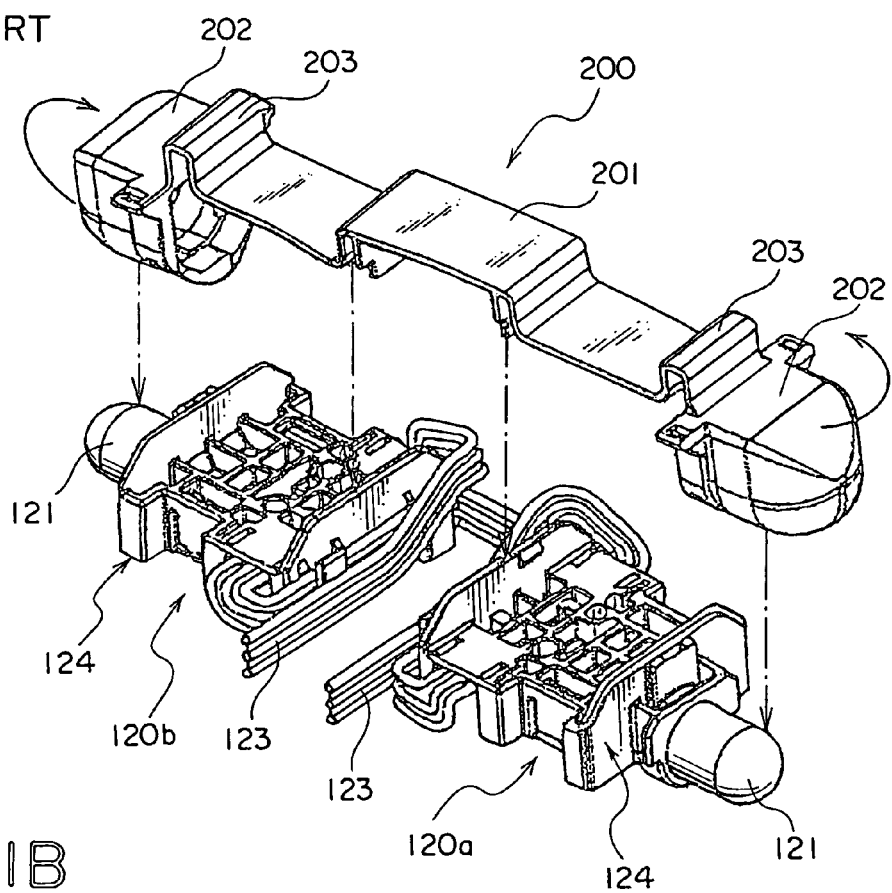
FIG. 11A is a perspective view of a pair of functional modules having a lamp by prior art and a protecting holder having a cover for covering the lamp.
Figure 11B:
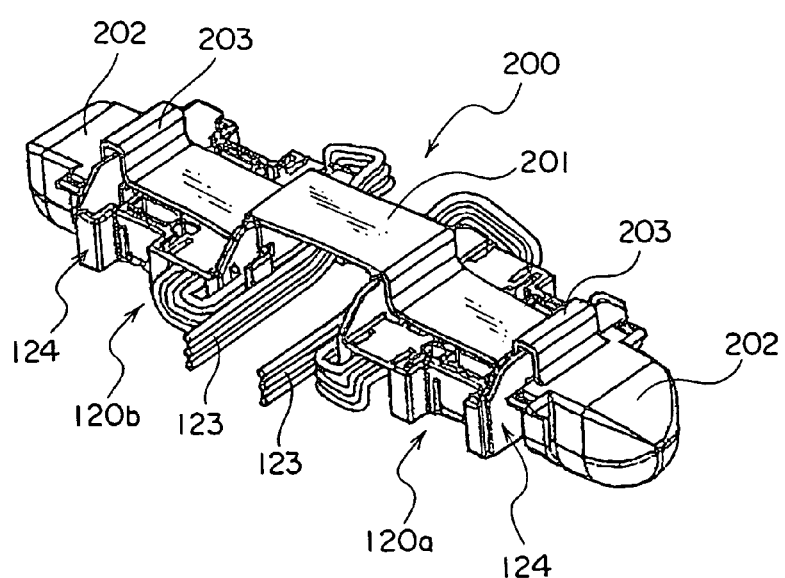
FIG. 11B is a perspective view of the pair of functional modules attached to the protecting holder shown in FIG. 11A.

An electrical assembly of a second embodiment according to the present invention will be described with reference to FIGS. 7-10. FIG. 7 is a perspective view showing a condition of making the pair of functional modules according to the second embodiment of the present invention face to each other. FIG. 8 is an expanded perspective view of VIII area in FIG. 7. FIG. 9 is a perspective view showing a condition of fixing the pair of functional modules shown in FIG. 7 to each other. FIG. 10 is an exploded perspective view of a lamp unit having the functional module of the embodiment according to the present invention. In FIGS. 7-10, components as same as those in the first embodiment are put with the same mark and the description is omitted.

According to the embodiment, as shown in FIG. 7, fixing members 50 engaging with the housing 24 of the mating functional module 20a, 20b are provided at edges, far from the bottom wall 24, of two surround walls 24b corresponding to each other of the functional modules 20a, 20b.

The fixing member 50 includes a lock main body 51 extending from one end of the bottom wall 24a, that is one end of the housing 24, toward the other end of the bottom wall 24a, that is the other end of the housing 24, and a lock receiving portion 52 arranged at one end of the lock main body 51, and a lock portion 53 arranged at the other end of the lock main body 51.

The lock main body 51 includes a pair of walls 51a arranged with a space to face to each other, and a groove 51b formed between the pair of walls 51a. When the pair of functional modules 20a, 20b are stacked on each other, one of the mating pair of walls 51a is received in the groove 51b.

The lock portion 53 has projecting portions 53a arranged respectively at the other ends of the pair of walls 51a and projecting from the other ends toward an outside of the housing 24 along a lengthwise of the walls 51a.

The lock receiving portion 52, as shown in FIG. 8, includes a pair of lock walls 52a, 52c and a connecting portion 52b connecting top ends of the pair of lock walls 52a, 52c, far from the bottom wall 24a. A bottom end of the lock wall 52a near to the bottom wall 24a is continued to one of the pair of walls 51a, which is located at an outer side of the housing 24. The lock wall 51c is arranged with a distance from one of the pair of walls 51a, which is located at an inner side of the housing 24. The lock receiving portion 52 is elastically bendable along the lengthwise of the lock main body 51. By positioning the projecting portion 53a in a space surrounded with the lock walls 52a, 52c and the connecting portion 52b, the lock receiving portion 52 is engaged with the lock portion 53, that is the projecting portion 53a.

According to the fixing member 50, as shown in FIG. 9, when the pair of functional modules 20a, 20b are stacked on each other, the walls 51a of the functional modules 20a, 20b are received respectively in the groove portion 51b of the mating functional module 20b, 20a, and the projecting portions 53a are engaged with the lock receiving portions 52 of the mating functional module 20a, 20b. Thereby, the housings 24 are fixed to each other. The lock portion 53 and the lock receiving portion 52 provided at the both end in a lengthwise of the lock main body 51 are engaged with the lock receiving portion 52 and the lock portion 53 of the mating lock main body 52. Thereby, displacement between the housings 24 in a lengthwise of the lock main body 51, that is the housing 24, is limited. Since the projecting portion 53a is held by the connecting portion 52b, displacement of the housings 24 in a direction of opposite way is limited. Since the wall 51a is received in the groove 51b of the mating functional module 20a, 20b, displacement of the housings 24 along a widthwise of the housing 24 is limited.

According to the embodiment, since the bulbs 21 are aligned in parallel to each other by stacking the pair of functional modules 20a, 20b so as to engage the lock portions 53 of the functional module 20a, 20b and the lock receiving portion 52 of the mating functional portion 20a, 20b, the identification mark 32 in the first embodiment can be eliminated.

When the functional module 20a, 20b according to the embodiment is transported to the assembling line and mounted on the roof trim 10, the wall 12a provided in the lengthwise of the lens 12 is received in the groove 51b of the lock main body 51. Thereby, manufacturability of assembling the functional module 20a, 20b and the lens 12 is improved.

According to the embodiment, by stacking the pair of functional modules 20a, 20b so as to align the lamps 21 face to each other in parallel, and engaging the lock portion 53 of the functional module 20a, 20b and the lock receiving portion 52 of the functional module 20a, 20b, the housings 24 can be fixed to each other. Thereby, without bundling member such as vinyl tape, the housings 24 can be fixed to each other, and amount of recycle material and waste material can be minimized.

In the embodiment, the lamp 21 is arranged in the central area of the bottom wall 24a of the housing 24. According to the present invention, the lamp 21 can be arranged at an end area of the bottom wall 24a of the housing 24 or any location of the bottom wall 24a. In the present invention, the electric component is not limited to the functional module 20a, 20b of the lamp unit 2.

In the embodiment, the housing 24 is turned in 180 degrees in a direction of facing the electric components, and stacked. By arranging the electric components at an area other than the center area of the housing 24, the housings 24 can be stacked to each other without turning alternatively.

While, in the embodiment, the present invention is described, it is not limited thereto, and various change and modifications can be made with the scope of the present invention.

What is claimed is:

1. An electrical assembly comprising:
   a housing having first and second rooms formed therein; and
   an electric component, comprising a lamp disposed in the first room of the housing and a switch disposed in the second room of the housing, mounted on the housing so as to project a part of said electric component to outside of the housing,
   wherein, the lamp or the switch is arranged as a projected part of the electric component projecting from a flat surface of the housing and arranged to be received in a room of a mating housing of an identical mating electrical assembly when the housings of a pair of the electrical assemblies are stacked upon each other so as to make the electric components of one mating electrical assembly and the electrical components of an identical mating electrical assembly face each other, with the lamp received in the second room of the housing and the switch received in the first room of the housing.

2. The electrical assembly according to claim 1, wherein the electric component is inclined against a flat surface of the housing.

3. The electrical assembly according to claim 2, further comprising a fixing member for fixing the housing of the electrical assembly and the mating housing of the identical mating electrical assembly when the identical electrical assembly is stacked on the mating electrical assembly so as to make the electric components face each other.

4. The electrical assembly according to claim 3, wherein the fixing member includes:
   a lock main body projecting from the housing and extending linearly from one end of the housing toward the other end of the housing;
   a lock receiving portion arranged at one end of the lock main body; and
   a lock portion provided at the other end of the lock main body for engaging with the lock receiving portion of the identical mating electrical assembly.

5. The electrical assembly according to claim 1, wherein a mark for distinguishing a direction, in which the identical electrical assembly must be stacked on the mating electrical assembly, is provided at the both of the housing and the mating housing.

6. A method of transporting an electrical assembly having a housing, having first and second rooms formed therein, and an electric component, comprising a lamp disposed in the first room of the housing and a switch disposed in the second room of the housing, mounted on the housing so as to project a part of a said electric component, at a slant to a flat surface of the housing, to outside of the housing, comprising the steps of:

stacking a pair of identical electrical assemblies on each other so as to make the electric components of one said mating electrical assembly and the electrical components of another identical mating electrical assembly face each other;

receiving the projected part of the electric component of the electrical assembly into a room provided in the another identical mating electrical assembly for protecting the electric component with the lamp received in the second room of the housing and the switch received in the first room of the housing;

fixing the housings of the pair of the electrical assemblies to each other; and transporting the pair of the electrical assemblies.

* * * * *